(12) United States Patent
Hayashi et al.

(10) Patent No.: US 9,908,481 B2
(45) Date of Patent: Mar. 6, 2018

(54) VEHICLE FORWARD INFORMATION ACQUIRING DEVICE

(71) Applicant: TOYOTA JIDOSHA KABUSHIKI KAISHA, Toyota-shi, Aichi-ken (JP)

(72) Inventors: Hideaki Hayashi, Toyota (JP); Atsutoshi Sakaguchi, Toyota (JP); Tomohiko Futatsugi, Toyota (JP); Masaaki Uechi, Nagoya (JP); Naoki Taki, Okazaki (JP); Akio Kimura, Toyota (JP); Kumiko Kondo, Nisshin (JP); Hiroshi Harada, Nagakute (JP); Toshifumi Kawasaki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 2 days.

(21) Appl. No.: 14/995,571

(22) Filed: Jan. 14, 2016

(65) Prior Publication Data
US 2016/0229355 A1 Aug. 11, 2016

(30) Foreign Application Priority Data

Feb. 6, 2015 (JP) ................................. 2015-022147

(51) Int. Cl.
*B60R 11/04* (2006.01)
*G01D 11/24* (2006.01)
*B60R 11/00* (2006.01)

(52) U.S. Cl.
CPC ............ *B60R 11/04* (2013.01); *G01D 11/245* (2013.01); *B60R 2011/0026* (2013.01)

(58) Field of Classification Search
CPC .................................................... G01D 11/24

USPC .......................................................... 348/148
See application file for complete search history.

(56) References Cited

U.S. PATENT DOCUMENTS

| 5,820,097 A * | 10/1998 | Spooner .................... B60R 1/04 248/475.1 |
| 7,480,149 B2 * | 1/2009 | DeWard .................. B60R 11/04 340/438 |
| 7,911,356 B2 * | 3/2011 | Wohlfahrt ............. B60S 1/0822 248/674 |
| 8,339,453 B2 * | 12/2012 | Blake, III ............... B60R 11/00 348/148 |

(Continued)

FOREIGN PATENT DOCUMENTS

| JP | 2012-091596 A | 5/2012 |
| JP | 2013-193558 A | 9/2013 |

*Primary Examiner* — Harshad R Patel
*Assistant Examiner* — Jamel Williams
(74) *Attorney, Agent, or Firm* — Oliff PLC

(57) ABSTRACT

A vehicle forward information acquiring device includes a bracket fixed to a windshield, a cover mounted to the bracket by being moved along the bracket in one direction, and a vehicle forward information acquiring sensor accommodated between the bracket and the cover. The cover is mounted to the bracket while being pressed against the bracket by a first elastic force and a second elastic force generated when a first engaging portion and a second engaging portion formed on the cover are respectively engaged with a first engaged portion and a second engaged portion formed on the bracket. A position of the cover on the bracket when the first elastic force becomes a maximum value is different from a position of the cover on the bracket when the second elastic force becomes a maximum value.

6 Claims, 9 Drawing Sheets

(56) References Cited

U.S. PATENT DOCUMENTS

| | | | |
|---|---|---|---|
| 9,090,213 B2* | 7/2015 | Lawlor | |
| 2007/0237517 A1* | 10/2007 | Park | G03B 17/00 396/427 |
| 2008/0231704 A1* | 9/2008 | Schofield | B60R 1/04 348/148 |
| 2011/0193960 A1* | 8/2011 | Endo | B60Q 1/0023 348/148 |
| 2012/0099849 A1* | 4/2012 | Onishi | B60R 11/04 396/419 |
| 2014/0211010 A1* | 7/2014 | Alexander | B60R 1/00 348/148 |
| 2014/0313337 A1* | 10/2014 | Devota | B60R 11/04 348/148 |
| 2015/0015713 A1* | 1/2015 | Wang | H04N 5/235 348/148 |
| 2015/0042798 A1* | 2/2015 | Takeda | H04N 5/2252 348/148 |
| 2015/0109447 A1* | 4/2015 | Okuda | B60R 11/04 348/148 |

* cited by examiner

VEHICLE FORWARD INFORMATION ACQUIRING DEVICE

BACKGROUND OF THE INVENTION

1. Field of the Invention

The present invention relates to a vehicle forward information acquiring device configured to acquire vehicle forward information.

2. Description of the Related Art

In some vehicles such as an automobile, for the purpose of acquiring and recording vehicle forward information, or for the purpose of assisting a driver in driving a vehicle, a vehicle forward information acquiring sensor of a vehicle forward information acquiring device mounted in a vehicle cabin acquires the vehicle forward information. As the vehicle forward information acquiring sensor, a charge-coupled device (CCD) camera, a radar sensor, and an infrared sensor are exemplified. A sensor, which is used as the vehicle forward information acquiring sensor particularly for preventing collision of the vehicle, is called a pre-crash safety sensor (abbreviated as "PCS sensor"). In general, the vehicle forward information acquiring sensor (abbreviated as "information acquiring sensor" as needed) is mounted to a bracket, which is fixed on an inner surface of a windshield by bonding, so that the mounting state is maintained.

For example, in Japanese Patent Application Laid-open No. 2012-91596, the following configuration is disclosed as an example of the vehicle forward information acquiring device. Specifically, an onboard camera configured to capture a forward scene of a vehicle is employed as the information acquiring sensor, and a flat spring serving as a spring mechanism is arranged on the onboard camera. The onboard camera is mounted to a bracket fixed to a windshield.

In some types of information acquiring sensors, in order to ensure fine appearance of a portion to which each information acquiring sensor is mounted, and/or to protect the information acquiring sensor, a cover is mounted to a bracket so as to cover the information acquiring sensor mounted to the bracket. It is preferred that, similarly to a case of mounting the information acquiring sensor to the bracket, a windshield be not excessively pressed toward an outer side of the vehicle through intermediation of the bracket also when the cover is mounted to the bracket. Accordingly, it is preferred that the cover be mounted to the bracket by being moved up to a preset position along the bracket in a predetermined direction defined substantially along the windshield.

In order to firmly mount the cover to the bracket, it is preferred that a plurality of engaging portions and a plurality of engaged portions including a pressing spring mechanism be formed on the cover and the bracket, and that the cover be mounted to and retained on the bracket while being pressed thereto by the engaging portions and the engaged portions. In this case, the plurality of engaging portions and the plurality of engaged portions are constructed such that engagement of all of the engaging portions and the engaged portions is completed when the cover is moved up to the preset position.

However, while the cover is moved to the preset position, the engaging portions and the engaged portions generate a significant elastic force of mutually pressing the bracket and the cover, thereby generating a significant reaction force against the movement of the cover to the preset position. Accordingly, when all of the engaging portions and the engaged portions generate the significant reaction force at the same time while the cover is moved to the preset position, a significant force needs to be applied to the cover so as to overcome the significant reaction force, which increases a burden imposed on a worker who mounts the cover.

SUMMARY OF THE INVENTION

It is a primary object of the present invention to reduce a reaction force generated by a plurality of engaging portions and a plurality of engaged portions in a vehicle forward information acquiring device constructed such that a cover is moved along a bracket in a predetermined direction, and is mounted to the bracket by the engaging portions and the engaged portions.

According to one embodiment of the present invention, there is provided a vehicle forward information acquiring device, including: a vehicle forward information acquiring sensor; a bracket fixed on an inner surface of a windshield; and a cover positioned on a side opposite to the windshield through intermediation of the bracket so as to cover the vehicle forward information acquiring sensor, in which the cover is mounted to the bracket by being moved up to a preset position along the bracket in a predetermined direction defined along the inner surface of the windshield, in which one of the bracket and the cover includes a first engaging portion and a second engaging portion spaced apart from each other in the predetermined direction, in which another one of the bracket and the cover includes a first engaged portion and a second engaged portion spaced apart from each other in the predetermined direction, in which the first engaging portion and the second engaging portion are engaged with the first engaged portion and the second engaged portion, respectively, through movement of the cover along the bracket in the predetermined direction, in which under a state in which the first engaging portion and the first engaged portion are engaged with each other, at least one of the first engaging portion and the first engaged portion is elastically deformed by another one of the first engaging portion and the first engaged portion to generate a first elastic force of mutually pressing the bracket and the cover, in which under a state in which the second engaging portion and the second engaged portion are engaged with each other, at least one of the second engaging portion and the second engaged portion is elastically deformed by another one of the second engaging portion and the second engaged portion to generate a second elastic force of mutually pressing the bracket and the cover, in which the first elastic force and the second elastic force are changed through the movement of the cover along the bracket in the predetermined direction, and in which a position of the cover on the bracket when the first elastic force becomes a maximum value is different from a position of the cover on the bracket when the second elastic force becomes a maximum value.

According to the above-mentioned configuration, the bracket and the cover are mutually pressed by the first elastic force generated when the first engaging portion and the first engaged portion are engaged with each other, and by the second elastic force generated when the second engaging portion and the second engaged portion are engaged with each other. The first elastic force and the second elastic force are changed through the movement of the cover along the bracket in the predetermined direction. However, the position of the cover on the bracket when the first elastic force becomes the maximum value is different from the position of the cover on the bracket when the second elastic force becomes the maximum value. Accordingly, the first elastic force and the second elastic force do not become the maximum values at the same time. Thus, as compared to a case where the first elastic force and the second elastic force become the maximum values at the same time, it is possible to reduce a reaction force caused by a frictional force and the like generated by the first elastic force and the second elastic force when moving the cover, thereby being capable of reducing a burden imposed on a worker who mounts the cover. In addition, it is possible to reduce a risk in that, in order to overcome the significant reaction force, a worker strongly pushes the cover by a force containing a component crossing the predetermined direction, to thereby cause the windshield to be pressed by an excessive force to an outer side of the vehicle through the bracket.

Note that, in this specification, the description "along the windshield" means that an inclination angle with respect to the windshield is 20 degrees or less, preferably 15 degrees or less, more preferably 10 degrees or less.

According to the one embodiment of the present invention, in the above-mentioned configuration, when the cover is moved toward the preset position along the bracket in the predetermined direction, the first engaging portion and the first engaged portion may start to be engaged with each other before the second engaging portion and the second engaged portion start to be engaged with each other, and the first engaging portion and the first engaged portion may allow the cover to be moved up to the preset position along the bracket also after the first engaging portion and the first engaged portion start to be engaged with each other.

According to the above-mentioned configuration, the first engaging portion and the first engaged portion start to be engaged with each other earlier than the second engaging portion and the second engaged portion, and allow the cover to be moved up to the preset position along the bracket also after the first engaging portion and the first engaged portion start to be engaged with each other. Accordingly, after the first engaging portion and the first engaged portion start to be engaged with each other, an engaging region between the first engaging portion and the first engaged portion guides movement of the cover along the bracket. Therefore, the cover can be moved along the bracket easily and properly, and the second engaging portion and the second engaged portion can be engaged with each other easily and properly.

According to the one embodiment of the present invention, in the above-mentioned configuration, the first engaging portion may be positioned on a forward side in a moving direction of the cover with respect to the second engaging portion.

According to the above-mentioned configuration, guiding of movement of the cover, which is performed in the above-mentioned manner through engagement between the first engaging portion and the first engaged portion, can be performed on the forward side in the moving direction of the cover with respect to the second engaging portion and the second engaged portion. Accordingly, as compared to a case of a configuration in which the first engaging portion is positioned on a backward side in the moving direction of the cover with respect to the second engaging portion, the cover can be moved along the bracket easily and properly, and the second engaging portion and the second engaged portion can be engaged with each other easily and properly.

Further, according to the one embodiment of the present invention, in the above-mentioned configuration, the first engaging portion and the first engaged portion may be constructed such that the first elastic force gradually increases to reach the maximum value, and then decreases while the cover is moved to the preset position, and that the first elastic force is generated also when the cover is at the preset position.

According to the above-mentioned configuration, when the cover is moved in a direction opposite to the predetermined direction, the first elastic force increases. Accordingly, the first engaging portion and the first engaged portion can exert action of preventing reverse movement, thereby being capable of reducing a risk in that the cover slips out of the bracket. Further, also when the cover is at the preset position, the first elastic force is generated. Accordingly, it is possible to maintain a state in which the bracket and the cover are mutually pressed, thereby being capable of stably retaining the cover at the preset position.

Further, according to the one embodiment of the present invention, in the above-mentioned configuration, when the cover is moved from the preset position in a direction opposite to the predetermined direction, at least one of the first elastic force and the second elastic force may increase to prevent the cover from being displaced from the bracket in the direction opposite to the predetermined direction.

According to the above-mentioned configuration, when the cover is to be displaced from the preset position in the direction opposite to the predetermined direction, at least one of the first elastic force and the second elastic force increases to prevent the cover from being displaced from the bracket in the direction opposite to the predetermined direction. Accordingly, without special means exerting action of preventing reverse movement, the cover can be prevented from being displaced from the bracket in the direction opposite to the predetermined direction to slip out of the bracket.

Further, according to the one embodiment of the present invention, the vehicle forward information acquiring sensor may be mounted to the bracket at a predetermined mounting position before the cover is mounted to the bracket, the vehicle forward information acquiring sensor may include an elastic deformation portion, and when the vehicle forward information acquiring sensor is mounted to the bracket at a position other than the predetermined mounting position, the elastic deformation portion may interfere with the cover due to elastic deformation caused by the bracket, to thereby prevent the cover from being mounted to the bracket.

According to the above-mentioned configuration, when the vehicle forward information acquiring sensor is mounted to the bracket at the position other than the predetermined mounting position, the elastic deformation portion interferes with the cover so that the cover cannot be mounted to the bracket. Accordingly, it is possible to easily and effectively prevent the cover from being mounted to the bracket under a state in which the vehicle forward information acquiring sensor is not mounted to the bracket at the predetermined mounting position.

DETAILED DESCRIPTION OF THE PREFERRED EMBODIMENTS

Now, a preferred embodiment of the present invention is described in detail with reference to the attached drawings.

Embodiment

Figure 1:
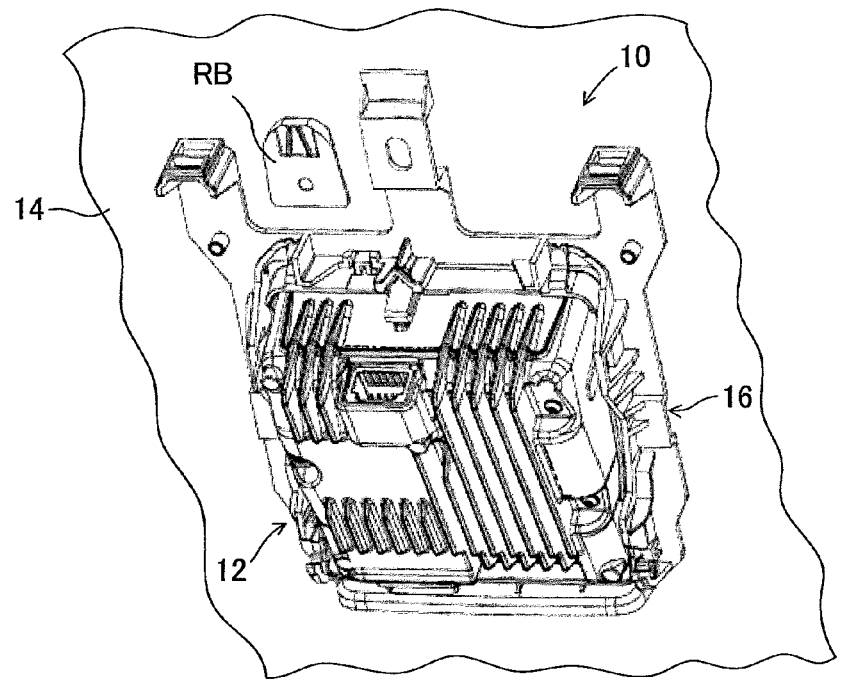
FIG. 1 is a perspective view of a PCS sensor of a PCS sensor device constructed as a vehicle forward information acquiring device according to an embodiment of the present invention viewed obliquely from behind and from below, for illustrating a state in which the PCS sensor is mounted to a bracket and a cover is removed from the PCS sensor device.

FIG. 1 is a perspective view of a PCS sensor of a PCS sensor device 10 constructed as a vehicle forward information acquiring device according to an embodiment of the present invention viewed obliquely from behind and from below, for illustrating a state in which the PCS sensor is mounted to a bracket and a cover is removed from the PCS sensor device 10. Further, FIG. 2 is a perspective view of the PCS sensor device 10 of FIG. 1 viewed obliquely from behind and from below, for illustrating a state in which the cover is mounted to the bracket.

Note that, in the following description, "positional relationships such as a front end and a right side" and "directions such as a forward direction" refer to positional relationships and directions when a front of a vehicle is viewed from an inside of a vehicle cabin under a state in which the PCS sensor is mounted to the vehicle. Further, in the attached drawings of the present application, illustration of a cross-section by hatching is omitted to avoid complicated illustration.

<Configuration of PCS Sensor Device 10>

Figure 2:
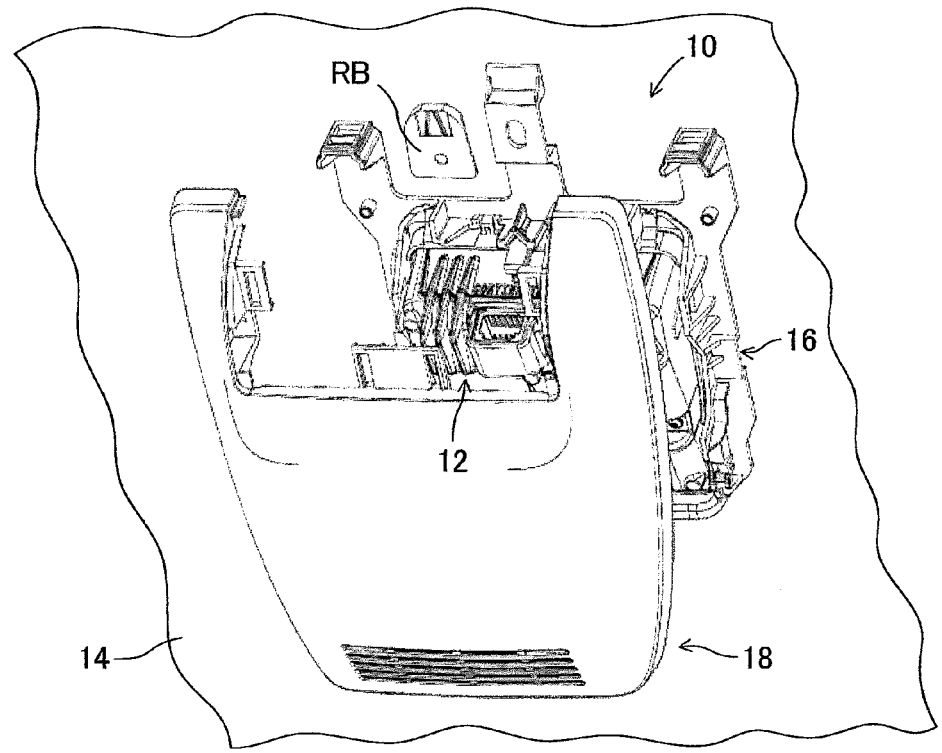
FIG. 2 is a perspective view of the PCS sensor device of FIG. 1 viewed obliquely from behind and from below, for illustrating a state in which the cover is mounted to the bracket.

As illustrated in FIG. 1 and FIG. 2, the PCS sensor device 10 includes a PCS sensor 12, a bracket 16 fixed on an inner surface of a windshield 14 by bonding, and a cover 18 covering the PCS sensor 12. The windshield 14 is mounted to a vehicle body so as to extend forward and downward in a tilting posture as approaching to the front of the vehicle (not shown).

Note that, the bracket 16 and the cover 18 are made of a resin, but may be made of other materials such as metal. Further, in FIG. 1 and FIG. 2, there is illustrated a base RB configured to mount a foot portion of a rearview mirror (not shown) to the windshield 14, and the base RB is fixed on the inner surface of the windshield 14 by bonding. In the illustrated embodiment, the PCS sensor device 10 surrounds a part of the base RB, but does not need to surround the base RB.

The cover 18 is positioned on a side opposite to the windshield 14 through intermediation of the bracket 16. The cover 18 has a sectional shape curved into a concave shape so as to be capable of accommodating the PCS sensor 12 between the bracket 16 and the cover 18. As described later in detail, the cover 18 is mounted to the bracket in such a manner that the cover 18 is moved up to a preset position along the bracket 16 in a predetermined direction (rearward and upward direction of the vehicle) defined substantially along the inner surface of the windshield 14.

Figure 3:
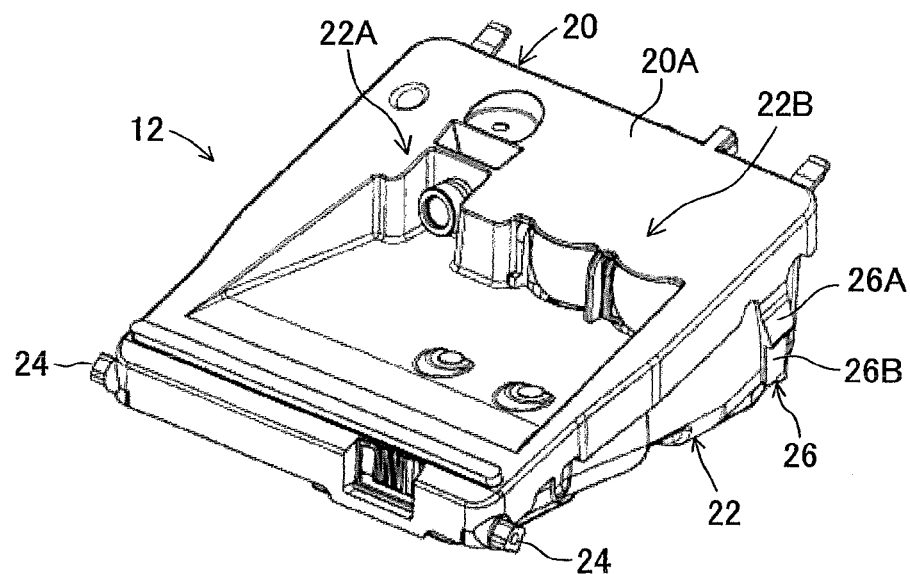
FIG. 3 is a perspective view of the PCS sensor viewed obliquely from front and from above.
Figure 4:
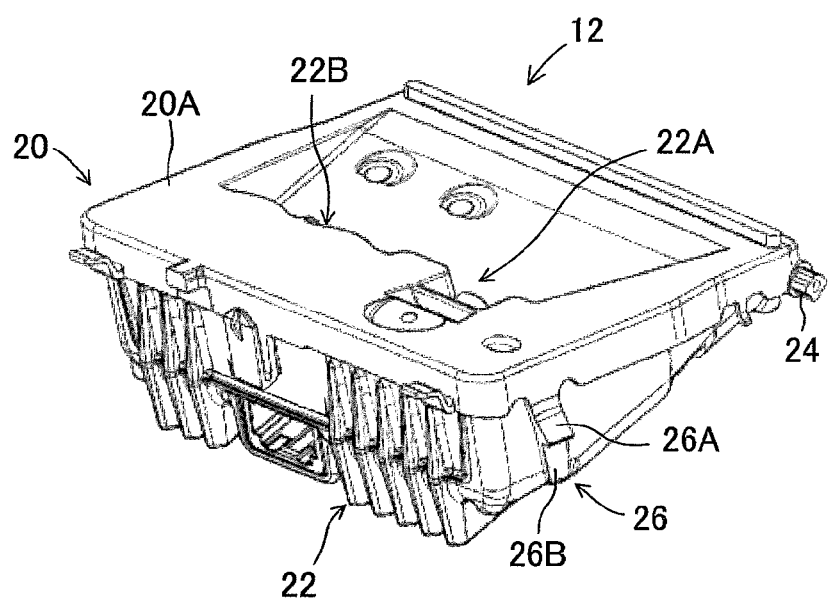
FIG. 4 is a perspective view of the PCS sensor viewed obliquely from behind and from above.

As illustrated in FIG. 3 and FIG. 4, the PCS sensor 12 includes a resin support base member 20 and a sensor body 22 fixed to the support base member 20. The sensor body 22 includes a CCD camera 22A configured to capture a forward scene of the vehicle, and a radar sensor device 22B. Note that, a configuration of the PCS sensor 12 is not important for the present invention. The PCS sensor 12 may have any configuration as long as the PCS sensor 12 has a function of acquiring vehicle forward information. Further, a part of a plurality of sensors configured to acquire the vehicle forward information may be arranged, for example, behind an emblem mounted at a front end of the vehicle.

Figure 5:
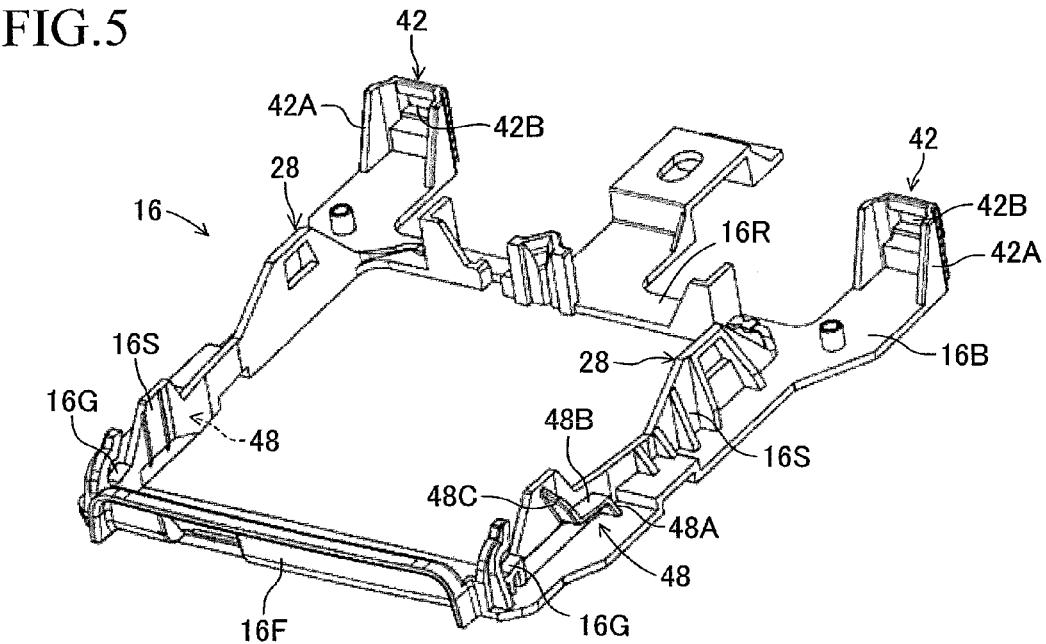
FIG. 5 is a perspective view of the bracket.

As illustrated in FIG. 5, the bracket 16 has a rectangular frame shape, and includes a pair of side wall portions 16S spaced apart from each other in a vehicle lateral direction, and a front connection portion 16F and a rear connection portion 16R integrally connecting the side wall portions. A distance between inner surfaces of the pair of side wall portions 16S in the vehicle lateral direction is slightly larger than a width of the PCS sensor 12 in the vehicle lateral direction, and a distance between inner surfaces of the front connection portion 16F and the rear connection portion 16R in a vehicle fore-and-aft direction is slightly larger than a length of the PCS sensor 12 in the vehicle fore-and-aft direction. The pair of side wall portions 16S and the front connection portion 16F are arranged on a base portion 16B extending along a plane in a flange fashion, and the bracket 16 is fixed at the base portion 16B to the inner surface of the windshield 14 by bonding.

Figure 6:
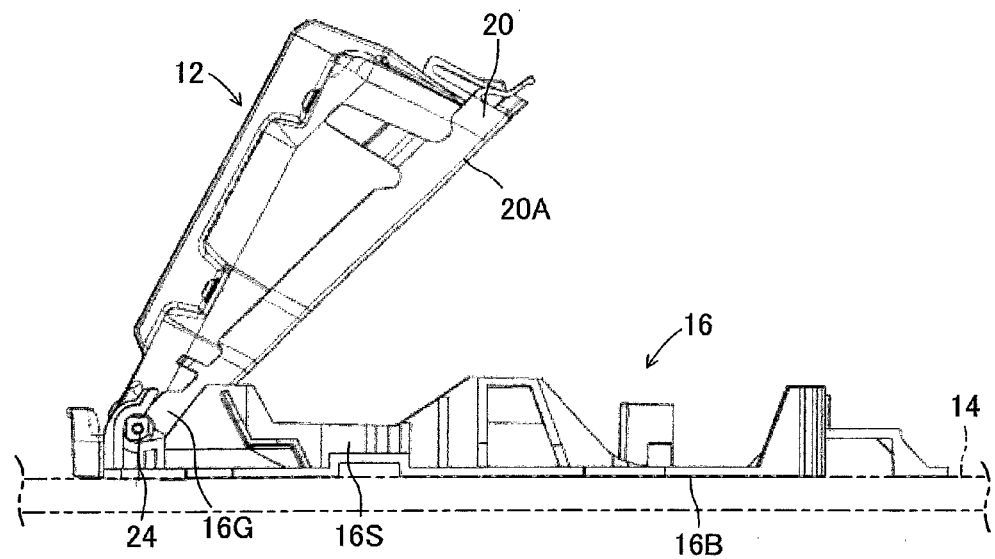
FIG. 6 is a side view for illustrating a procedure of mounting the PCS sensor to the bracket.
Figure 7:
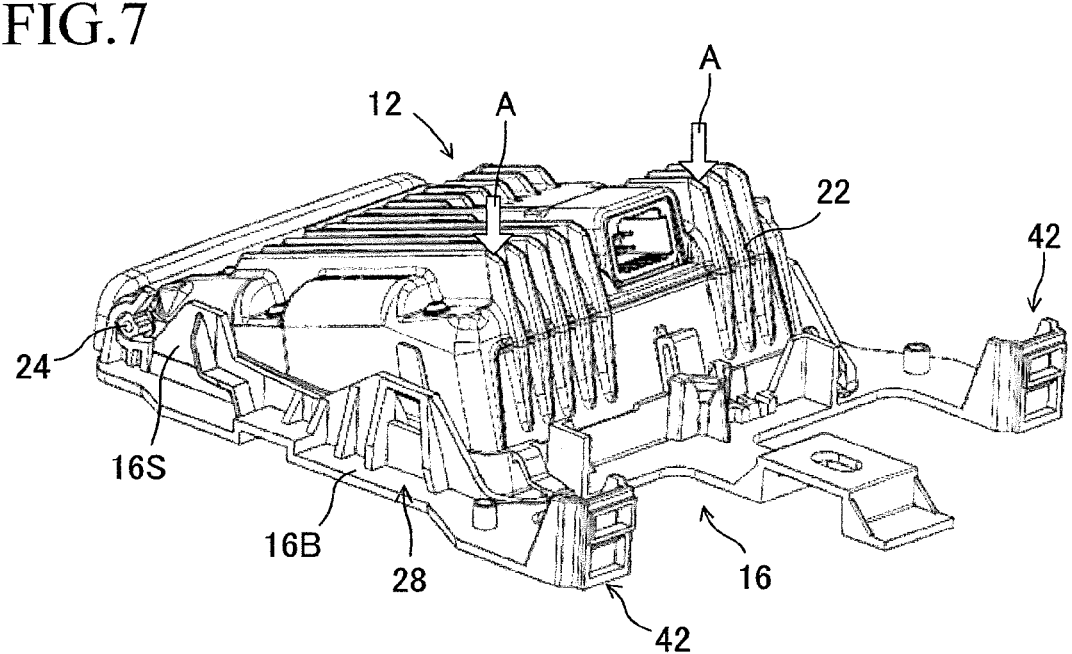
FIG. 7 is a perspective view for illustrating a state in which the PCS sensor is mounted to the bracket.

As illustrated in FIG. 3 and FIG. 4, a pair of pins (support shafts) 24 is respectively arranged at side portions of a front end portion of the sensor body 22 to protrude in the vehicle lateral direction. Grooves 16G configured to receive the pins 24 are formed in the side wall portions 16S of the bracket 16, respectively. When the PCS sensor 12 is mounted to the bracket 16, as illustrated in FIG. 6, under a state in which a flat plate-like bottom wall portion 20A of the support base member 20 is inclined at about 45° with respect to the base portion 16B of the bracket 16, the pair of pins 24 is fitted into the grooves 16G. Next, a rear end portion of the PCS sensor 12 is pressed against the bracket 16 in a direction indicated by the arrows A of FIG. 7 so that the PCS sensor 12 is pivoted about the pins 24. Thus, the PCS sensor 12 is mounted to the bracket 16 at a predetermined mounting position.

As illustrated in FIG. 3 and FIG. 4, non-return engaging portions 26 that are elastically deformable are integrally formed on both side portions of the support base member 20 of the PCS sensor 12. Each of the non-return engaging portions 26 extends apart from the sensor body 22 so as to protrude to a side opposite to the bottom wall portion 20A of the support base member 20 with respect to the sensor body 22. Each of the non-return engaging portions 26 includes a non-return claw portion 26A and an interference claw portion 26B formed integrally with the non-return claw portion and positioned on a distal end side of each of the non-return engaging portions 26 with respect to the non-return claw portion. The non-return claw portion 26A is formed on an outer surface side of each of the non-return engaging portions 26 (on a side opposite to the sensor body 22).

As illustrated in FIG. 5, engaged portions 28 that can be engaged with the corresponding non-return claw portions 26A in a non-return manner are formed on the side wall portions 16S of the bracket 16, respectively. A distance between inner surfaces of the pair of engaged portions 28 in the vehicle lateral direction is larger than a distance between outer surfaces of proximal portions of the pair of non-return engaging portions 26. Accordingly, when the PCS sensor 12 is mounted to the bracket 16, each of the non-return engaging portions 26 is positioned on an inner side of corresponding one of the engaged portions 28.

Figure 8:
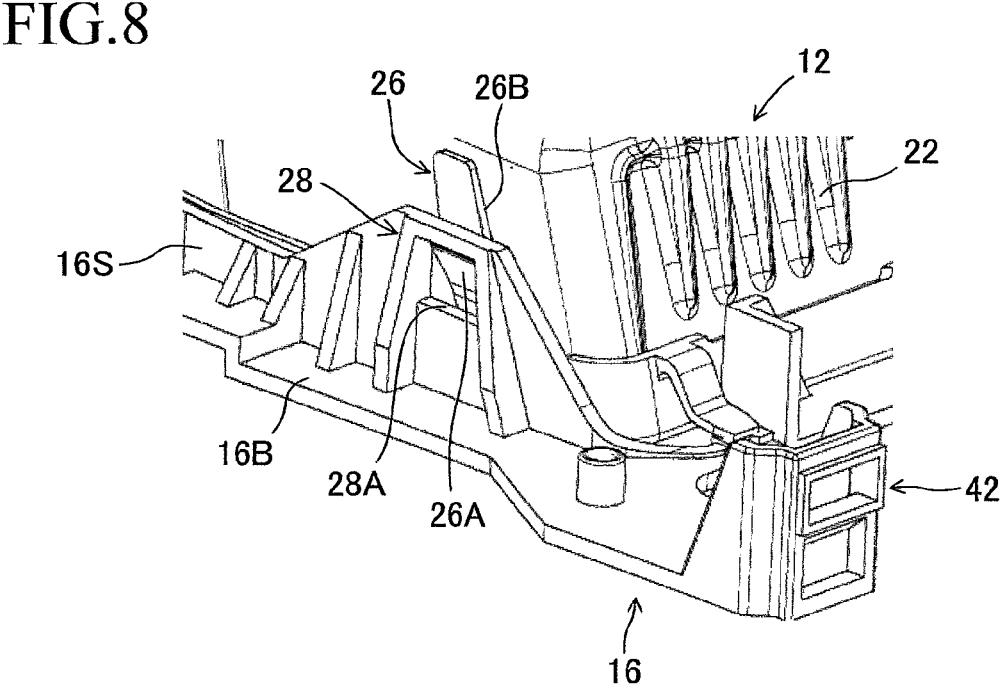
FIG. 8 is an enlarged partial perspective view for illustrating a state in which a non-return engaging portion formed on a support base member of the PCS sensor, and an engaged portion formed on a side wall portion of the bracket are engaged with each other in a non-return manner.
Figure 9:
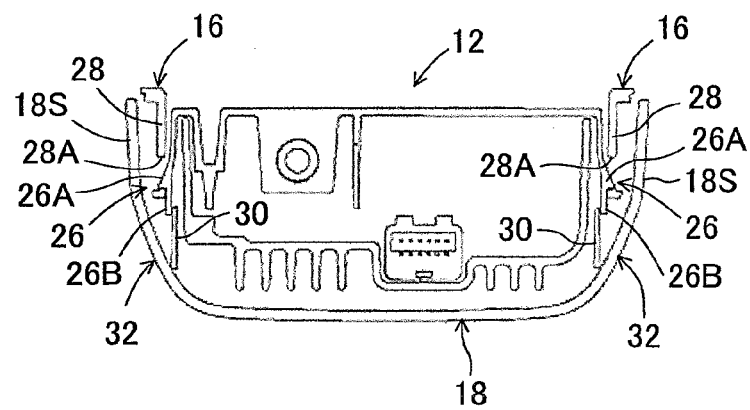
FIG. 9 is a sectional view taken along a direction perpendicular to a moving direction of the cover, for illustrating a state in which the PCS sensor and the cover are mounted to the bracket.

As illustrated in FIG. 8 and FIG. 9, when the PCS sensor 12 is positioned on the bracket 16 at the predetermined mounting position, each of the non-return claw portions 26A is fitted into a hole 28A formed in corresponding one of the engaged portions 28, and the engaged portions 28 are engaged with the non-return claw portions 26A in a non-return manner. In this manner, mounting of the PCS sensor 12 to the bracket 16 is completed so that the PCS sensor 12 is retained on the bracket 16 and the windshield 14 at the predetermined mounting position.

Note that, when the rear end portion of the PCS sensor 12 is pressed against the bracket 16 to mount the PCS sensor 12 to the bracket 16 at the predetermined mounting position, it is preferred that an excessive force be not applied to the windshield 14 through the bracket 16. Accordingly, it is preferred that one part of the rear end portion of the PCS sensor 12 in the vehicle lateral direction be pressed against the bracket 16, and then the other part of the rear end portion thereof in the vehicle lateral direction be pressed against the bracket 16.

Figure 10:
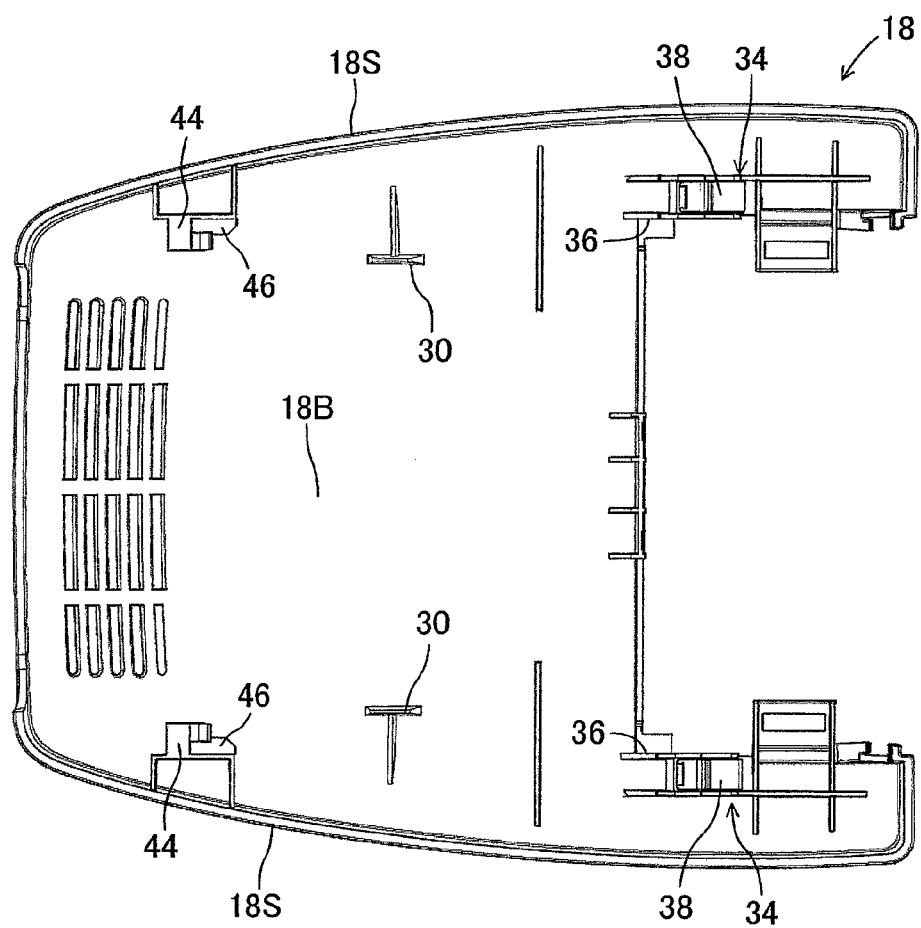
FIG. 10 is a plan view of an inner surface side of the cover.

As illustrated in FIG. 9 and FIG. 10, a pair of protrusions 30 is formed on an inner surface of the cover 18 integrally with a bottom wall portion 18B. The pair of protrusions 30 is spaced apart from each other in the vehicle lateral direction, and extends in the vehicle fore-and-aft direction at positions adjacent to side wall portions 18S. When the PCS sensor 12 is positioned on the bracket 16 at the predetermined mounting position and the non-return claw portions 26A are fitted into the holes 28A formed in the engaged portions 28, a distal end portion of each of the protrusions 30 is positioned on an inner side of corresponding one of the interference claw portions 26B. Accordingly, the protrusions 30 do not interfere with the interference claw portions 26B of the non-return engaging portions 26. Thus, the cover 18 can be mounted to the bracket 16.

However, when the PCS sensor 12 is not mounted to the bracket 16 at the predetermined mounting position and the non-return claw portions 26A are not fitted into the holes 28A, the non-return engaging portions 26 are elastically deformed by the engaged portions 28 inward (toward the sensor body 22). Consequently, the protrusions 30 interfere with the interference claw portions 26B of the non-return engaging portions 26, thereby preventing the cover 18 from being mounted to the bracket 16. Accordingly, the non-return engaging portions 26, the engaged portions 28, and the protrusions 30 construct an improper mounting prevention structure 32 configured to prevent the cover 18 from being mounted to the bracket 16 under a state in which the PCS sensor 12 is mounted to the bracket 16 improperly.

Figure 11:
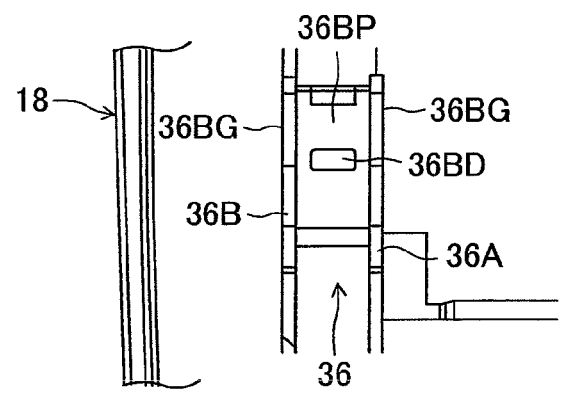
FIG. 11 is an enlarged partial view of a support portion of a first engaging portion formed on the inner surface of the cover.
Figure 12:
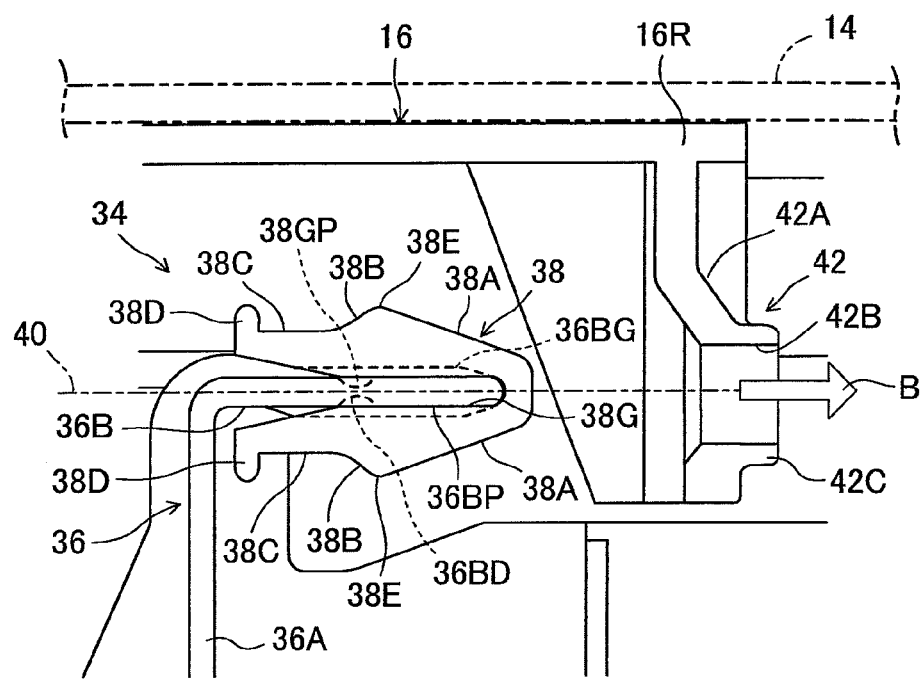
FIG. 12 is an enlarged partial side view of a clip member of the first engaging portion.

As illustrated in FIG. 10, on the inner side of the cover 18, a pair of first engaging portions 34 is formed at vehicle-rear-side positions with respect to the pair of protrusions 30. Each of the first engaging portions 34 includes a support portion 36 formed integrally with the bottom wall portion 18B of the cover 18, and a clip member 38 that is supported on the support portion and is elastically deformable. As illustrated in FIG. 11 and FIG. 12, each support portion 36 includes a prop portion 36A protruding in a direction crossing the inner surface of the cover 18, and a support arm 36B formed integrally with the prop portion and extending away from the protrusion 30.

The support arm 36B includes a pair of guide portions 36BG respectively positioned at both side portions of the support arm 36B and extending in parallel to each other, and a plate-shaped portion 36BP integrally connecting the guide portions 36BG. A thickness of the plate-shaped portion 36BP is smaller than thicknesses of the guide portions 36BG, and a dent 36BD is formed in each of an upper surface and a lower surface of the plate-shaped portion 36BP. A groove 38G configured to receive the support arm 36B is formed in the clip member 38, and convex portions 38GP protruding in directions of approaching to each other are formed on a wall surface of the groove 38G. The support arm 36B is fitted into the groove 38G, and the convex portions 38GP are engaged into the dents 36BD. In this manner, the clip member 38 is supported on the support portion 36 while being prevented from slipping out of the support arm 36B.

As illustrated in FIG. 12, when viewed from the vehicle lateral direction, the clip member 38 exhibits substantially an arrowhead shape symmetrical to a center line 40 extending along a predetermined direction indicated by the arrow B of FIG. 12. That is, the clip member 38 includes a tip 38A gradually increased in vertical width as approaching in a direction opposite to the predetermined direction, a non-return engaging portion 38B gradually decreased in vertical width as approaching in the above-mentioned opposite direction, a constant vertical width portion 38C having a constant vertical width, and a stopper portion 38D having a vertical width larger than that of the constant vertical width portion 38C. Note that, the above-mentioned vertical widths refer to dimensions extending in a direction perpendicular to both the vehicle lateral direction and the center line 40. In addition, in cross-section taken along a direction perpendicular to the vehicle lateral direction and parallel to the center line 40, the clip member 38 exhibits substantially a uniform contour in an entire width of the clip member 38 in the vehicle lateral direction.

As illustrated in FIG. 5 and FIG. 12, a pair of first engaged portions 42 is formed on the rear connection portion 16R of the bracket 16. When the cover 18 is mounted to the bracket 16, the pair of first engaged portions 42 is engaged with the corresponding first engaging portions 34. Each of the first engaged portions 42 includes a bracket portion 42A formed integrally with the rear connection portion 16R to protrude away from the windshield 14. A rectangular hole 42B, into which the clip member 38 is inserted, is formed in the bracket portion 42A.

The bracket portion 42A includes a ledge portion 42C formed above and below the hole 42B to extend in the predetermined direction. A length of the ledge portion 42C along a direction of the center line 40 is equal to or slightly smaller than a length of the constant vertical width portion 38C of the clip member 38. Accordingly, when the constant vertical width portion 38C of the clip member 38 is fitted into the hole 42B, the ledge portion 42C is arranged between the non-return engaging portion 38B and the stopper portion 38D.

A width of the hole 42B (dimension thereof in the vehicle lateral direction) is slightly larger than a width of the clip member 38. Accordingly, when the clip member 38 is fitted into the hole 42B, the clip member 38 can be displaced from the bracket portion 42A in the predetermined direction, but cannot be displaced from the bracket portion 42A in the vehicle lateral direction. A height of the hole 42B (dimension thereof in a protruding direction of the bracket portion 42A) is smaller than the above-mentioned vertical width of the constant vertical width portion 38C of the clip member 38. Accordingly, when the clip member 38 is fitted into the hole 42B, the clip member 38 is elastically compressed and deformed by the bracket portion 42A in an up-and-down direction perpendicular to the center line 40, thereby generating a first elastic force F1 (see FIG. 17).

As illustrated in FIG. 10, a pair of second engaging portions 44 is formed on the inner surfaces of the side wall portions 18S of the cover 18 in the vehicle lateral direction, and each of the second engaging portions 44 is spaced apart from corresponding one of the first engaging portions 34 in a direction opposite to the predetermined direction. The second engaging portions 44 are formed integrally with the side wall portions 18S so as to protrude from the side wall portions 18S in directions of approaching to each other, and extend along the predetermined direction. Guide protrusions 46 are respectively formed on the second engaging portions 44 on a side of the bottom wall portion 18B of the cover 18. The guide protrusions 46 are also formed integrally with the side wall portions 18S so as to protrude from the side wall portions 18S in directions of approaching to each other, and extend along the predetermined direction. However, a protruding height of each guide protrusion 46 is smaller than a protruding height of each second engaging portion 44.

As illustrated in FIG. 5, a pair of second engaged portions 48 is formed on outer surfaces of the side wall portions 16S of the bracket 16, respectively. The second engaged portions 48 are engaged with the corresponding second engaging portions 44 when the cover 18 is mounted to the bracket 16. Each of the second engaged portions 48 is spaced apart from corresponding one of the first engaged portions 42 in a direction opposite to the predetermined direction. A side portion of each of the second engaged portions 48 is integrated with corresponding one of the side wall portions 16S of the bracket 16, and includes a support portion 48A, a flat spring portion 48B connected integrally with an end of the support portion 48A, and a guide portion 48C connected integrally with an end of the flat spring portion 48B.

Each of the support portion 48A and the guide portion 48C obliquely extends away from the base portion 16B as approaching to the end thereof, but the flat spring portion 48B extends along the predetermined direction. When the cover 18 is moved along the bracket 16 in the predetermined direction, a side surface of the guide portion 48C on a side opposite to corresponding one of the side wall portions 16S is brought into abutment on corresponding one of the guide protrusions 46. In this manner, the cover 18 is positioned on the bracket 16 in the vehicle lateral direction, and the flat spring portion 48B is guided to corresponding one of the second engaging portions 44.

A distance between the base portion 16B and the flat spring portion 48B is slightly smaller than a distance between the base portion 16B and a surface of the second engaging portion 44 on the bottom wall portion 18B side under a state in which the cover 18 is mounted to the bracket 16. Accordingly, when the cover 18 is mounted to the bracket 16 and the flat spring portion 48B is engaged with the second engaging portion 44, the flat spring portion 48B is elastically deformed by the second engaging portion 44 toward the bottom wall portion 18B, thereby generating a second elastic force F2 (see FIG. 17). Therefore, the second engaging portion 44 is pressed against the bracket 16 by a spring force generated due to elastic deformation of the flat spring portion 48B so that the cover 18 is pressed against the bracket 16.

<Mounting of Cover 18>

FIG. 13 to FIG. 16 are illustrations of procedures of mounting the cover 18 to the bracket 16 in the PCS sensor device 10 constructed as described above. Note that, before mounting the cover 18, the PCS sensor 12 is mounted in the above-mentioned manner to the bracket 16 fixed on the windshield 14. In FIG. 13 to FIG. 16, illustration of the PCS sensor 12 is omitted.

First, the cover 18 is positioned on the bracket 16 so that each side wall portion 18S of the cover 18 is positioned on an outer side of corresponding one of the side wall portions 16S of the bracket 16, and that an edge of the side wall portion 18S is held in abutment on the base portion 16B. When positioning of the cover 18 is completed, as indicated by the arrow B of each of FIG. 13 to FIG. 16, the cover 18 is moved along the bracket 16 in the predetermined direction.

Figure 13:
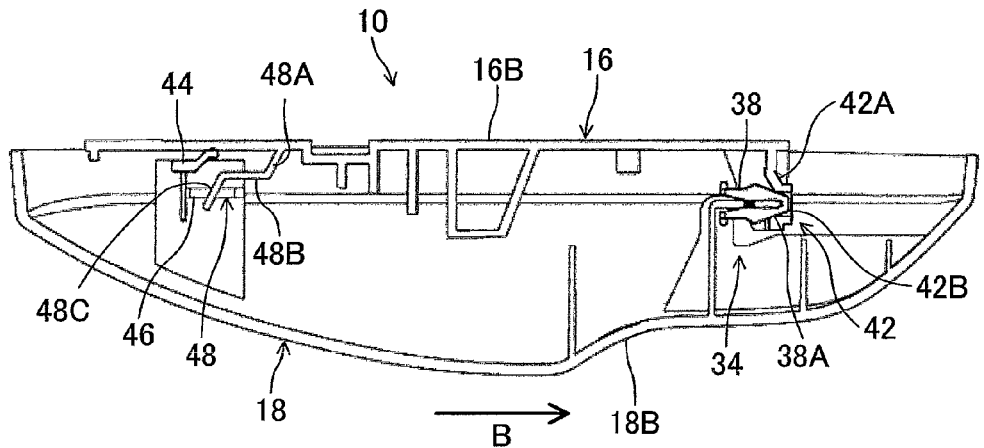
FIG. 13 is a sectional view for illustrating a state in which the clip member of the first engaging portion is brought into abutment on a bracket portion of a first engaged portion.

At a position illustrated in FIG. 13, the tip 38A of the clip member 38 of each of the first engaging portions 34 is fitted into the hole 42B formed in the bracket portion 42A of each of the first engaged portions 42, but the clip member 38 is not compressed and deformed by the bracket portion 42A. The flat spring portion 48B of each of the second engaged portions 48 partially overlaps the guide protrusion 46 as illustrated in FIG. 13, but is spaced apart from the second engaging portion 44. Accordingly, both the elastic force F1 and the elastic force F2 are zero.

Figure 14:
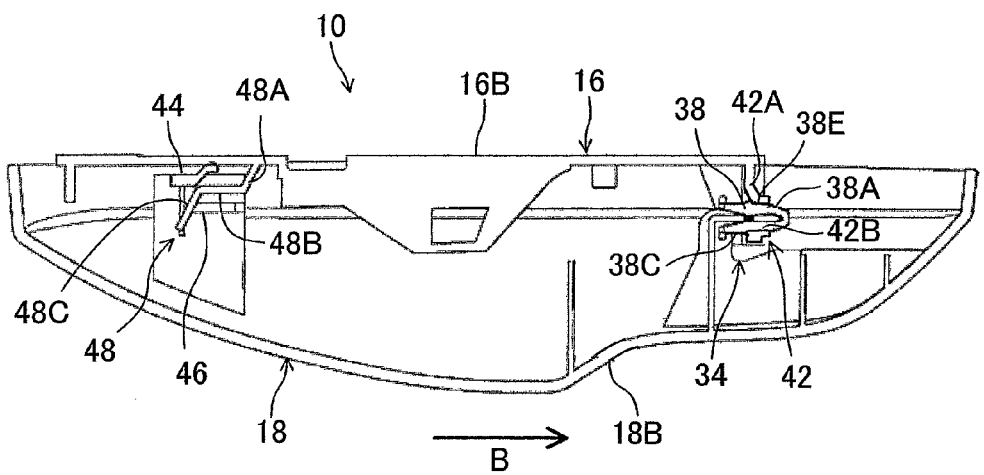
FIG. 14 is a sectional view for illustrating a state in which a ridge portion of the clip member is fitted into a hole of the bracket portion.

At a position illustrated in FIG. 14, the clip member 38 is fitted into the hole 42B at a ridge portion 38E formed between the tip 38A and the non-return engaging portion 38B, and the clip member 38 is compressed and deformed by the bracket portion 42A, thereby generating the elastic force F1. Note that, a compression and deformation amount and the elastic force F1 of the clip member 38 are maximum when the clip member 38 is at the position illustrated in FIG.

14. The flat spring portion 48B of each of the second engaged portions 48 continues to partially overlap the guide protrusion 46, and the end of the flat spring portion 48B is close to the second engaging portion 44.

Figure 15:
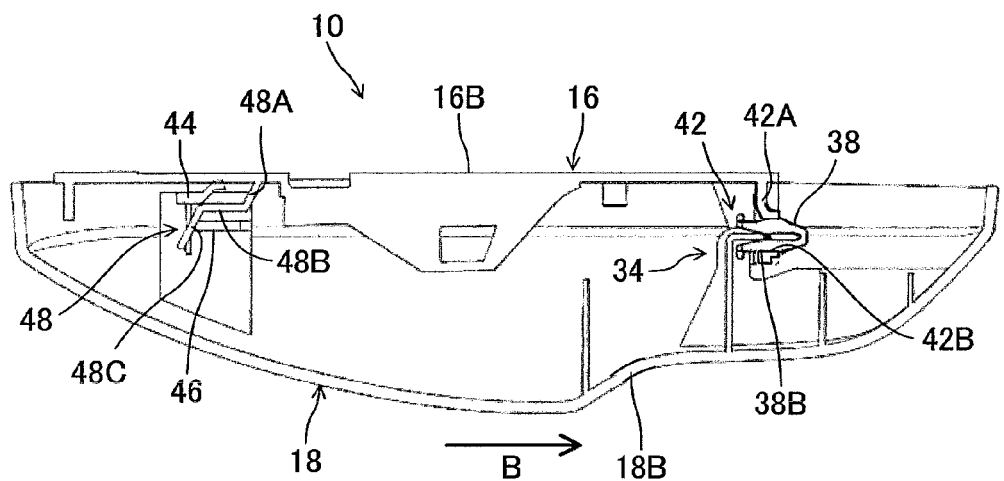
FIG. 15 is a sectional view for illustrating a state in which a non-return engaging portion of the clip member is fitted into the hole of the bracket portion.

At a position illustrated in FIG. 15, the non-return engaging portion 38B of the clip member 38 is fitted into the hole 42B, and the compression and deformation amount of the clip member 38 is smaller than that in the case of the position illustrated in FIG. 14. Accordingly, the elastic force F1 is smaller than that in the case of the position illustrated in FIG. 14. The flat spring portion 48B of each of the second engaged portions 48 starts to be engaged with corresponding one of the second engaging portions 44 so as to climb onto corresponding one of the second engaging portions 44 at the end portion of the flat spring portion 48B. The end portion of the flat spring portion 48B is elastically deformed by corresponding one of the second engaging portions 44 toward the bottom wall portion 18B, thereby generating the elastic force F2.

Figure 16:
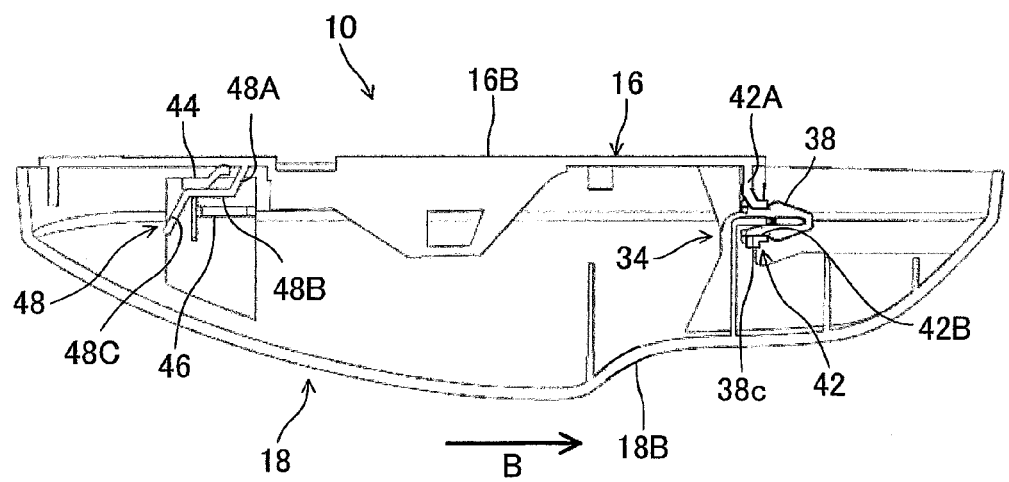
FIG. 16 is a sectional view for illustrating a state in which a constant vertical width portion of the clip member is fitted into the hole of the bracket portion.

At a position illustrated in FIG. 16, the cover 18 is moved up to a preset position along the bracket 16. The constant vertical width portion 38C of the clip member 38 is fitted into the hole 42B, and the ledge portion 42C of the bracket portion 42A is positioned between the non-return engaging portion 38B and the stopper portion 38D. Accordingly, displacement of the cover 18 from the bracket 16 is substantially prevented, and the elastic force F1 is smaller than that in the case of FIG. 15. A wider region of the flat spring portion 48B of each of the second engaged portions 48 is engaged with corresponding one of the second engaging portions 44, thereby increasing an amount of elastic deformation of the flat spring portion 48B toward the bottom wall portion 18B caused by corresponding one of the second engaging portions 44. Therefore, each of the second engaging portions 44 is pressed toward the base portion 16B of the bracket 16 by the elastic force F2 generated due to elastic deformation of the flat spring portion 48B, with the result that the cover 18 is pressed against the bracket 16.

Note that, as illustrated in FIG. 16, when the cover 18 is moved up to the preset position along the bracket 16, it is not necessary to further move the cover 18. When a pressing force applied to the cover 18 is released and becomes zero, the elastic force F1 and the elastic force F2 are kept as they are, but a reaction force generated during movement of the cover 18 becomes zero.

Further, as described above, when the clip member 38 is fitted into the hole 42B, the clip member 38 can be displaced from the bracket portion 42A in the predetermined direction (direction indicated by the arrow B), but cannot be displaced from the bracket portion 42A in the vehicle lateral direction. Further, when the cover 18 is moved along the bracket 16 in the predetermined direction, the side surface of the guide portion 48C is brought into abutment on corresponding one of the guide protrusions 46. In this manner, the cover 18 is positioned on the bracket 16 in the vehicle lateral direction. Accordingly, the cover 18 is prevented from moving along the bracket 16 in a twisting manner, with the result that the pair of clip members 38 is substantially simultaneously fitted into the corresponding holes 42B.

As is apparent from the above description, when the bracket 16 and the cover 18 are brought into the state illustrated in FIG. 16, mounting of the cover 18 to the bracket 16 is completed. The cover 18 is retained at the predetermined mounting position over the bracket 16 and the windshield 14 in such a manner that the pair of first engaging portions 34 and the pair of first engaged portions 42 are engaged with each other and the pair of second engaging portions 44 and the pair of second engaged portions 48 are engaged with each other as described above.

<Dismounting of Cover 18>

For example, when the PCS sensor 12 needs to be maintained or replaced, it is necessary to dismount the cover 18 from the bracket 16. When the cover 18 is dismounted, the cover 18 is moved away from the bracket 16 in a direction opposite to the predetermined direction, that is, moved by being pressed or pulled in a direction opposite to the direction of the case of mounting. Thus, the positional relationship between the bracket 16 and the cover 18 changes from the positional relationship illustrated in FIG. 16 to the positional relationship illustrated in FIG. 13 in procedures reverse to the procedures of the case of mounting.

Accordingly, in the first engaging portion 34 and the first engaged portion 42, the non-return engaging portion 38B and the ridge portion 38E of the clip member 38 are compressed by upper and lower portions of the hole 42B of the bracket portion 42A so that the clip member 38 slips out of the hole 42B. In the second engaging portion 44 and the second engaged portion 48, climbing of the flat spring portion 48B on the second engaging portion 44 is cancelled so that the flat spring portion 48B is separated from the second engaging portion 44. Therefore, the cover 18 can be freely dismounted from the bracket 16.

Note that, after the cover 18 is dismounted from the bracket 16, access to the PCS sensor 12 is allowed. Thus, the PCS sensor 12 is also dismounted from the bracket 16 as needed in the procedures reverse to the procedures of the case of mounting. That is, each of the non-return engaging portions 26 is pushed from the outer side toward the sensor body 22, thereby cancelling the state in which the non-return claw portion 26A and the engaged portion 28 are engaged with each other in a non-return manner. In this case, non-return engagement of the pair of non-return claw portions 26A may be cancelled at the same time. Alternatively, after a non-return engagement state of one of the non-return claw portions 26A is cancelled, a non-return engagement state of another one of the non-return claw portions 26A may be cancelled.

When the non-return engagement states of both of the non-return claw portions 26A are cancelled, the rear end portion of the PCS sensor 12 can be moved away from the bracket 16. Accordingly, the rear end portion of the PCS sensor 12 is moved away from the bracket 16 so as to pivot the PCS sensor 12 about the pins 24 in a direction opposite to the direction at the time of mounting. In this manner, the PCS sensor 12 is dismounted from the bracket 16.

<Main Advantage of PCS Sensor Device 10>

(1) Reduction of Pressing Load when Mounting Cover 18

The pair of first engaging portions 34 and the pair of second engaging portions 44 are formed on the cover 18 apart from each other in the predetermined direction, and the pair of first engaged portions 42 and the pair of second engaged portions 48 are formed on the bracket 16 apart from each other in the predetermined direction.

When the cover 18 is moved along the bracket 16 in the predetermined direction to be mounted to the bracket 16, first, the first engaging portions 34 and the first engaged portions 42 are engaged with each other. In particular, until the non-return engaging portion 38B of the clip member 38 of each of the first engaging portions 34 is fitted into the hole 42B formed in the bracket portion 42A of each of the first engaged portions 42, the second engaging portions 44 are not engaged with the flat spring portions 48B of the second engaged portions 48.

Figure 17:
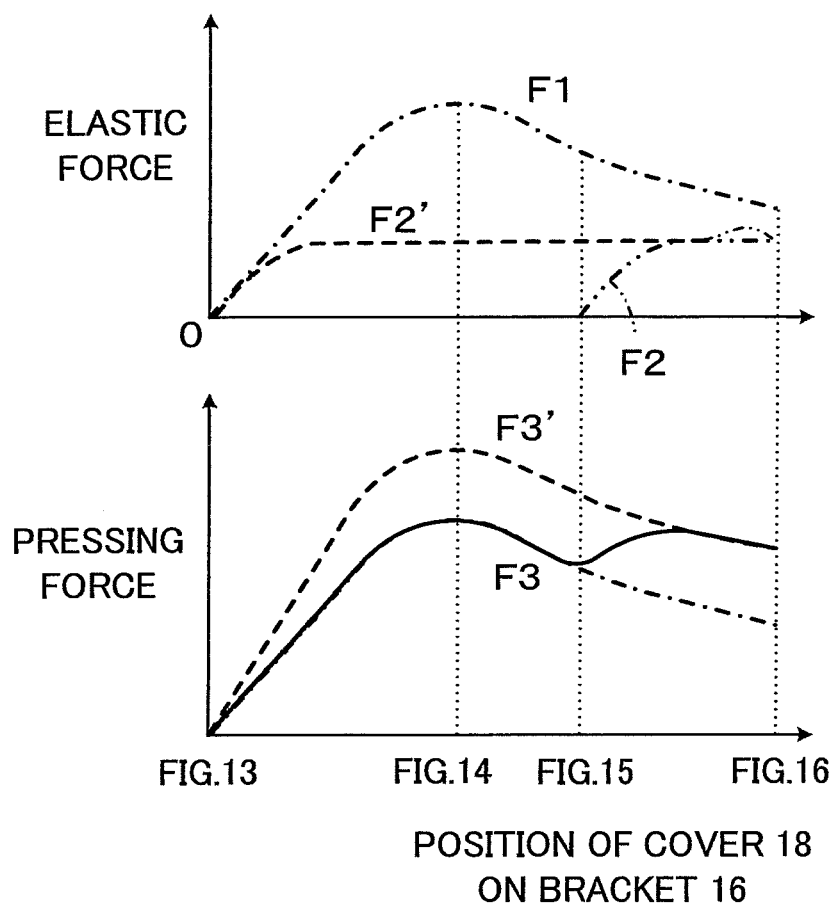
FIG. 17 is a graph for showing (in an upper row) a change in an elastic force F1 (indicated by the dot-and-dash line) generated in an up-and-down direction due to elastic deformation of the clip member and a change in an elastic force F2 (indicated by the dot-dot-dash line) generated in the up-and-down direction due to elastic deformation of a flat spring portion of a second engaging portion, and for showing (in a lower row) a change in a pressing force F3 that needs to be applied to the cover in order to move the cover along the bracket.

In an upper row of FIG. 17, there are shown a change in the first elastic force F1 (indicated by the dot-and-dash line) generated in the up-and-down direction due to elastic deformation of the clip member 38 along with movement of the cover 18 along the bracket 16, and a change in the second elastic force F2 (indicated by the dot-dot-dash line) generated in the up-and-down direction due to elastic deformation of the flat spring portion 48B along with the movement of the cover 18 along the bracket 16. Note that, in FIG. 17, the words "FIG. 13 to FIG. 16" shown in the horizontal axis of "position of cover 18 on bracket 16" represent that the cover 18 is at the position illustrated in each of FIG. 13 to FIG. 16.

In a lower row of FIG. 17, there is shown a change in a pressing force F3 that needs to be applied to the cover 18 in order to move the cover 18 along the bracket 16 in the predetermined direction. As shown in the lower row of FIG. 17, the pressing force F3 changes substantially in association with a sum of the elastic force F1 and the elastic force F2 (F1+F2).

For example, the pressing force F3 becomes a high value at a maximum value of the elastic force, which is generated when each of the second engaging portions 44 is engaged with the flat spring portion 48B of corresponding one of the second engaged portions 48 under a state in which the ridge portion 38E of the clip member 38 is fitted into the hole 42B. An elastic force F2' in this case is indicated by the broken line of the upper row of FIG. 17. Under a condition that the elastic force F1 becomes the maximum value, the elastic force F2' also becomes a maximum value. Accordingly, as indicated by the broken line of the lower row of FIG. 17, a pressing force F3' in this case becomes a significantly high value.

In contrast, in this embodiment, as shown in the upper row of FIG. 17, at a stage in which the elastic force F1 generated by the clip member 38 passes the maximum value and then gradually decreases, the elastic force F2 is generated by the flat spring portion 48B to gradually increase, and then becomes substantially constant. Accordingly, as indicated by the solid line of the lower row of the FIG. 17, the pressing force F3 can be prevented from becoming a significantly high value.

Therefore, according to this embodiment, as compared to a case where the elastic force F1 and the elastic force F2 become the maximum values at the same time, it is possible to reduce the force that is needed to press the cover 18 in order to move and mount the cover 18 to the bracket 16. Accordingly, it is possible to reduce a risk in that a worker who mounts the cover 18 strongly pushes the cover 18 by a force containing a component crossing the predetermined direction, to thereby press the windshield 14 through the bracket 16 by an excessive force. Therefore, for example, in an assembly line for vehicles, even when the cover 18 is mounted to the bracket 16 after the windshield 14 is mounted to the vehicle body by bonding, it is possible to prevent the windshield 14 from being separated from the vehicle body.

Note that, in order to be able to effectively reduce the pressing force F3, it is preferred that the elastic force F2 reach the maximum value at a stage in which the elastic force F1 is reduced to 90% or less of the maximum value, preferably 85% or less of the maximum value, more preferably 80% or less of the maximum value.

(2) Positioning and Guiding Performed by First Engaging Portions 34 and First Engaged Portions 42

Until each of the second engaging portions 44 starts to be engaged with the flat spring portion 48B after the clip member 38 starts to be fitted into the hole 42B, the clip member 38 keeps fitted into the hole 42B. Owing to this fitted state, the cover 18 is positioned on the bracket 16 so as not to be displaced in a direction other than the predetermined direction, and the cover 18 is guided so as to move along the bracket 16 in the predetermined direction. Therefore, the cover 18 can be easily mounted to the bracket 16 as compared to a case of a configuration of not performing the above-mentioned positioning and guiding, which may be achieved by keeping the clip member 38 fitted into the hole 42B.

(3) First Engaging Portions 34 and First Engaged Portions 42 Positioned on Forward Side in Moving Direction of Cover 18

In the moving direction of the cover 18 when moving the cover 18 along the bracket 16 in the predetermined direction, the first engaging portions 34 are positioned on a forward side with respect to the second engaging portions 44, and the first engaged portions 42 are positioned on the forward side with respect to the second engaged portions 48. Accordingly, the above-mentioned positioning and guiding, which may be achieved by fitting the clip member 38 into the hole 42B, are performed on the forward side in the moving direction of the cover 18. Therefore, the cover 18 can be easily moved along and mounted to the bracket 16 as compared to a case of a structure in which the first engaging portions 34 are positioned on a backward side with respect to the second engaging portions 44 and the first engaged portions 42 are positioned on the backward side with respect to the second engaged portions 48.

(4) Second Engaging Portions 44 and Second Engaged Portions 48 not Engaged with Each Other in Non-Return Manner Even after the cover 18 is moved up to the preset position along the bracket 16 so that mounting of the cover 18 to the bracket 16 is completed, the second engaging portions 44 and the second engaged portions 48 are not engaged with each other in a non-return manner. Accordingly, the cover 18 can be easily dismounted from the bracket 16 only by moving the cover 18 along the bracket 16 in a direction opposite to the predetermined direction to cancel the non-return engagement state between the clip member 38 and the bracket portion 42A in the above-mentioned manner.

(5) Improper Mounting Prevention Structure 32

In this embodiment, the non-return engaging portions 26, the engaged portions 28, and the protrusions 30 construct the improper mounting prevention structure 32. Therefore, it is possible to effectively prevent the cover 18 from being mounted to the bracket 16 under a state in which the PCS sensor 12 is mounted to the bracket 16 improperly.

In particular, the interference claw portion 26B, which interferes with the protrusion 30 to prevent mounting of the cover 18 when the PCS sensor 12 is mounted to the bracket 16 improperly, constructs the non-return engaging portion 26 together with the non-return claw portion 26A. Accordingly, as compared to a case where the interference claw portion 26B is formed in a region other than the non-return engaging portion 26 including the non-return claw portion 26A, it is possible to simplify a structure of the non-return engaging portion configured to mount the PCS sensor 12 to the bracket 16, and the improper mounting prevention structure 32.

(6) Positioning and Guiding of Cover 18 Achieved by Guide Protrusions 46 and Guide Portions 48C When the cover 18 is moved along the bracket 16, the side surface of the guide portion 48C of each of the second engaged portions 48 is brought into abutment on corresponding one of the guide protrusions 46. In this manner, the cover 18 is positioned on the bracket 16 in the vehicle lateral direction, and the flat spring portion 48B is guided onto corresponding one of the second engaging portions 44. Accordingly, as compared to a case where the cover 18 is not positioned and guided by the guide protrusions 46 and the guide portions 48C, it is possible to easily move the cover 18 up to the preset position and to easily mount the cover 18 to the bracket 16.

The specific embodiment of the present invention is described in detail above. However, the present invention is not limited to the above-mentioned embodiment. It is apparent for those skilled in the art that various other embodiments may be employed within the scope of the present invention.

For example, in the above-mentioned embodiment, in the moving direction of the cover 18 when moving the cover 18 along the bracket 16 in the predetermined direction, the first engaging portions 34 are positioned on the forward side with respect to the second engaging portions 44, and the first engaged portions 42 are positioned on the forward side with respect to the second engaged portions 48. However, modification may be made so that the first engaging portions 34 are positioned on the backward side with respect to the second engaging portions 44, and that the first engaged portions 42 are positioned on the backward side with respect to the second engaged portions 48.

Further, in the above-mentioned embodiment, even after the cover 18 is moved up to the preset position along the bracket 16, the second engaging portions 44 and the second engaged portions 48 are not engaged with each other in a non-return manner. However, modification may be made so that the second engaging portions 44 and the second engaged portions 48 are engaged with each other in a non-return manner. For example, modification may be made so that one end of each guide protrusion 46 is set to have a large protruding height, and that the guide portion 48C is engaged with the one end of the guide protrusion 46 in a non-return manner after the cover 18 is moved up to the preset position along the bracket 16. When this modification is made, the elastic force F2 changes, for example, as indicated by the thin dot-dot-dash line of FIG. 17.

Further, modification may be made so that the first engaging portions 34 and the first engaged portions 42 are not engaged with each other in a non-return manner, and that the second engaging portions 44 and the second engaged portions 48 are engaged with each other in a non-return manner. In addition, modification may be made so that the first engaging portions 34 and the first engaged portions 42 are not engaged with each other in a non-return manner, that the second engaging portions 44 and the second engaged portions 48 are not engaged with each other in a non-return manner, and that portions other than the above-mentioned engaging and engaged portions are engaged with each other in a non-return manner.

Further, in the above-mentioned embodiment, the clip member 38 of each first engaging portion 34 is elastically deformed to generate the elastic force F1, and the flat spring portion 48B of each second engaged portion 48 is elastically deformed to generate the elastic force F2. However, modification may be made so that each first engaged portion 42 is elastically deformed to generate the elastic force F1, or that both the first engaging portion 34 and the first engaged portion 42 are elastically deformed to generate the elastic force F1. Similarly, modification may be made so that each second engaging portion 44 is elastically deformed to generate the elastic force F2, or that both the second engaging portion 44 and the second engaged portion 48 are elastically deformed to generate the elastic force F2.

Further, in the above-mentioned embodiment, as shown in the upper row of FIG. 17, the elastic force F2 is generated by the flat spring portion 48B at the stage in which the elastic force F1 generated by the clip member 38 passes the maximum value and then gradually decreases. However, as long as the elastic force F1 and the elastic force F2 do not become the maximum values at the same time, the elastic force F2 may start to be generated before the cover 18 is moved to the position illustrated in FIG. 15.

Further, in the above-mentioned embodiment, the pair of pins 24 is fitted into the grooves 16G, and the rear end portion of the PCS sensor 12 is pressed against the bracket 16. In this manner, the PCS sensor 12 is mounted to the bracket 16. However, similarly to the cover 18, a vehicle forward information acquiring sensor like the PCS sensor 12 may be mounted to the bracket 16 by being moved along the bracket 16 in one direction.

Further, in the above-mentioned embodiment, the improper mounting prevention structure 32 is constructed by the non-return engaging portions 26, the engaged portions 28, and the protrusions 30. However, the improper mounting prevention structure 32 may be formed in a region other than the non-return engaging portions 26 configured to mount the PCS sensor 12 to the bracket 16, or the improper mounting prevention structure 32 may be omitted.

Still further, in the above-mentioned embodiment, the PCS sensor 12 is previously mounted to the bracket 16 at the predetermined position, and then the cover 18 is mounted to the bracket 16. However, modification may be made so that the PCS sensor 12 is temporarily fixed to the bracket 16 and, under this state, the cover 18 is mounted to the bracket 16, thereby moving the PCS sensor 12 to a predetermined position along the bracket 16 so as to mount the PCS sensor 12 to the bracket 16 at the predetermined position.

What is claimed is:

1. A vehicle forward information acquiring device, comprising:
   a vehicle forward information acquiring sensor;
   a bracket fixed on an inner surface of a windshield; and
   a cover positioned on a side opposite to the windshield through intermediation of the bracket so as to cover the vehicle forward information acquiring sensor,
   wherein the cover is mounted to the bracket by being moved up to a preset position along the bracket in a predetermined direction defined along the inner surface of the windshield,
   wherein one of the bracket and the cover comprises a first engaging portion and a second engaging portion spaced apart from each other in the predetermined direction,
   wherein another one of the bracket and the cover comprises a first engaged portion and a second engaged portion spaced apart from each other in the predetermined direction,
   wherein the second engaging portion is moved in the same direction as the first engaging portion along the inner surface of the windshield until the first engaging portion and the second engaging portion are engaged with the first engaged portion and the second engaged portion, respectively, through movement of the cover along the bracket in the predetermined direction,
   wherein, under a state in which the first engaging portion and the first engaged portion are engaged with each other, at least one of the first engaging portion and the first engaged portion is elastically deformed by another one of the first engaging portion and the first engaged portion to generate a first elastic force of mutually pressing the bracket and the cover, wherein, under a state in which the second engaging portion and the second engaged portion are engaged with each other, at least one of the second engaging portion and the second engaged portion is elastically deformed by another one of the second engaging portion and the second engaged portion to generate a second elastic force of mutually pressing the bracket and the cover, wherein the first elastic force and the second elastic force are changed through the movement of the cover along the bracket in the predetermined direction, and wherein a first position of the cover on the bracket when the first elastic force becomes a maximum value is different from a second position of the cover on the bracket when the second elastic force becomes a maximum value.

2. A vehicle forward information acquiring device according to claim 1, wherein when the cover is moved toward the preset position along the bracket in the predetermined direction, the first engaging portion and the first engaged portion start to be engaged with each other before the second engaging portion and the second engaged portion start to be engaged with each other, and wherein the first engaging portion and the first engaged portion allow the cover to be moved up to the preset position along the bracket also after the first engaging portion and the first engaged portion start to be engaged with each other.

3. A vehicle forward information acquiring device according to claim 2, wherein the first engaging portion is positioned on a forward side in a moving direction of the cover with respect to the second engaging portion.

4. A vehicle forward information acquiring device according to claim 2, wherein the first engaging portion and the first engaged portion are constructed such that the first elastic force gradually increases to reach the maximum value, and then decreases while the cover is moved to the preset position, and that the first elastic force is generated also when the cover is at the preset position.

5. A vehicle forward information acquiring device according to claim 1, wherein when the cover is moved from the preset position in a direction opposite to the predetermined direction, at least one of the first elastic force and the second elastic force increases to prevent the cover from being displaced from the bracket in the direction opposite to the predetermined direction.

6. A vehicle forward information acquiring device according to claim 1, wherein the vehicle forward information acquiring sensor is mounted to the bracket at a predetermined mounting position before the cover is mounted to the bracket, wherein the vehicle forward information acquiring sensor comprises an elastic deformation portion, and wherein when the vehicle forward information acquiring sensor is mounted to the bracket at a position other than the predetermined mounting position, the elastic deformation portion interferes with the cover due to elastic deformation caused by the bracket, to thereby prevent the cover from being mounted to the bracket.

\* \* \* \* \*